(12) United States Patent
Fukui et al.

(10) Patent No.: US 6,796,413 B2
(45) Date of Patent: Sep. 28, 2004

(54) ONE-WAY CLUTCH (75) Inventors: Kiyotaka Fukui, Nishiki-Machi (JP);
Tadashi Miyamoto, Nishiki-Machi (JP)

(73) Assignees: Musashi Seimitsu Kogyo Kabushiki Kaisha, Aichi-Ken (JP); Kyushu Musashi Seimitsu Kabushiki Kaisha, Kumamoto-Ken (JP)

( * ) Notice: Subject to any disclaimer, the term of this patent is extended or adjusted under 35 U.S.C. 154(b) by 0 days.

(21) Appl. No.: 10/282,385

(22) Filed: Oct. 29, 2002

(65) Prior Publication Data
US 2003/0085092 A1 May 8, 2003

(30) Foreign Application Priority Data
Nov. 7, 2001 (JP) ........................................ 2001-342377

(51) Int. Cl.[7] .............................................. F18D 41/06
(52) U.S. Cl. ........................ 192/42; 192/45; 192/45.1; 74/7 C
(58) Field of Search ................................ 192/41 R, 42, 192/45, 45.1; 74/6, 7 R, 7 C (56) References Cited
U.S. PATENT DOCUMENTS

| | | | | |
|---|---|---|---|---|
| 5,085,713 A | * | 2/1992 | Morishita et al. | 148/211 |
| 5,415,258 A | * | 5/1995 | Numata | 192/41 A |
| 5,620,074 A | * | 4/1997 | Zenmei et al. | 192/45 |
| 5,779,015 A | * | 7/1998 | Murata | 192/42 |
| 5,966,985 A | * | 10/1999 | Shuto et al. | 74/7 C |
| 6,534,880 B1 | * | 3/2003 | Sone et al. | 290/1 R |

FOREIGN PATENT DOCUMENTS

EP 0494681 A1 * 7/1992 ............ F02N/15/06

* cited by examiner

Primary Examiner—Richard M. Lorence
(74) Attorney, Agent, or Firm—Ladas & Parry (57) ABSTRACT

A one-way clutch of the invention includes an inner race supported for rotation on a power transmission shaft, an outer race concentrically surrounding the inner race, and torque transmitting members interposed between the inner race and the outer race and capable of transmitting torque in one direction of the inner race to the outer race. The outer race is integrally provided with an extending portion that extends inwardly in a radius direction thereof. The extending portion is capable of being engaged with the power transmission shaft.

12 Claims, 6 Drawing Sheets

ONE-WAY CLUTCH

TECHNICAL FIELD

The present invention relates to a one-way clutch to be employed in a starting system for an automobile or a motorcycle.

BACKGROUND ART

Figure 6:
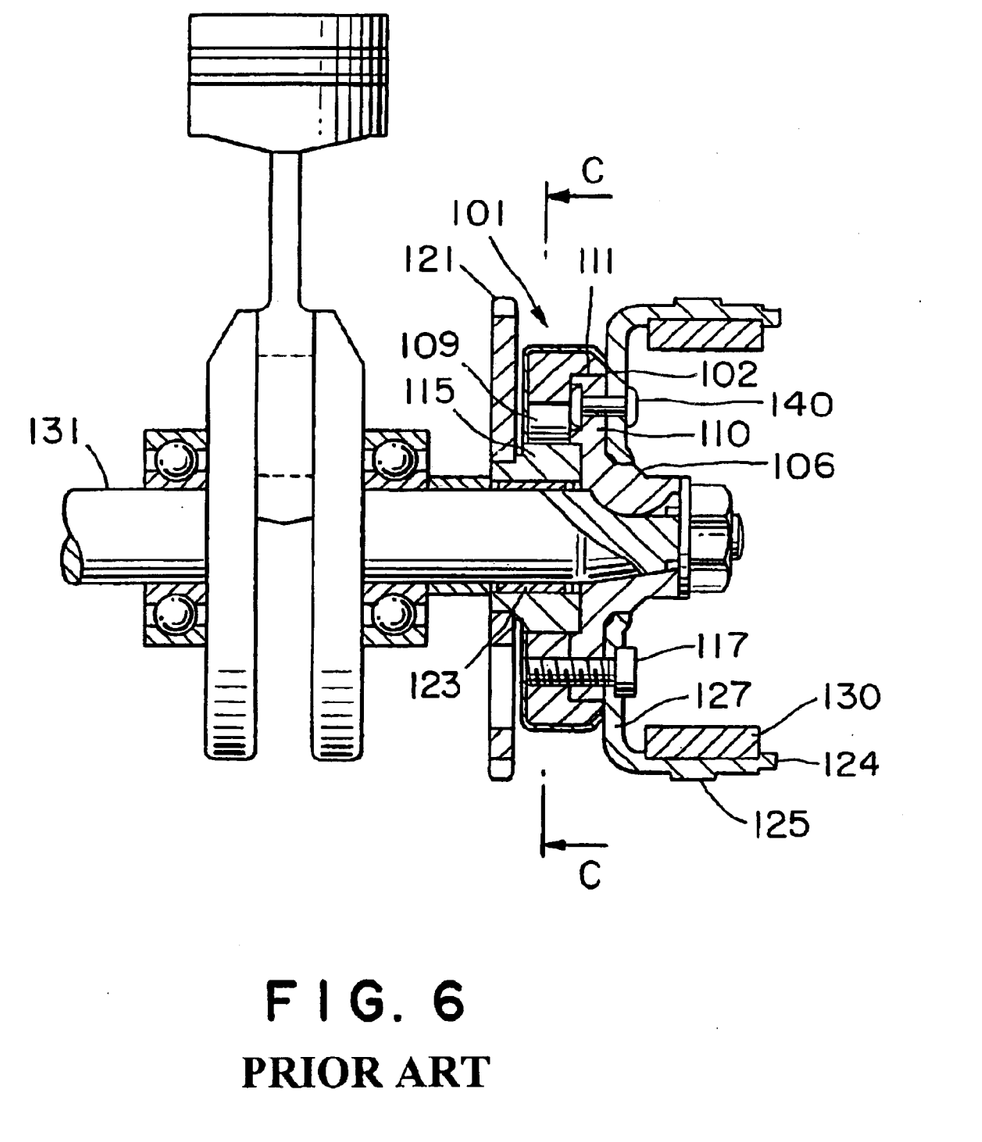
FIG. 6 is a partially sectional plan view of a conventional one-way clutch in a working state thereof.

As shown in FIG. 6, an engine for an automobile or the like is started by the driving force of a starting motor (not shown) being transmitted to a crankshaft 131, which is a power transmission shaft. A one-way clutch 101 is arranged to prevent the generation of reverse-direction power after the engine has been started.

The one-way clutch 101 includes: an inner race 115 supported for rotation on the crankshaft 131 by a seizure-preventing member (for example, a roller bearing) 123; an outer race 102 concentric with and surrounding the inner race 115; and rollers 109 interposed between the inner race 115 and the outer race 102. The rollers 109 serve as torque transmitting members.

Figure 7:
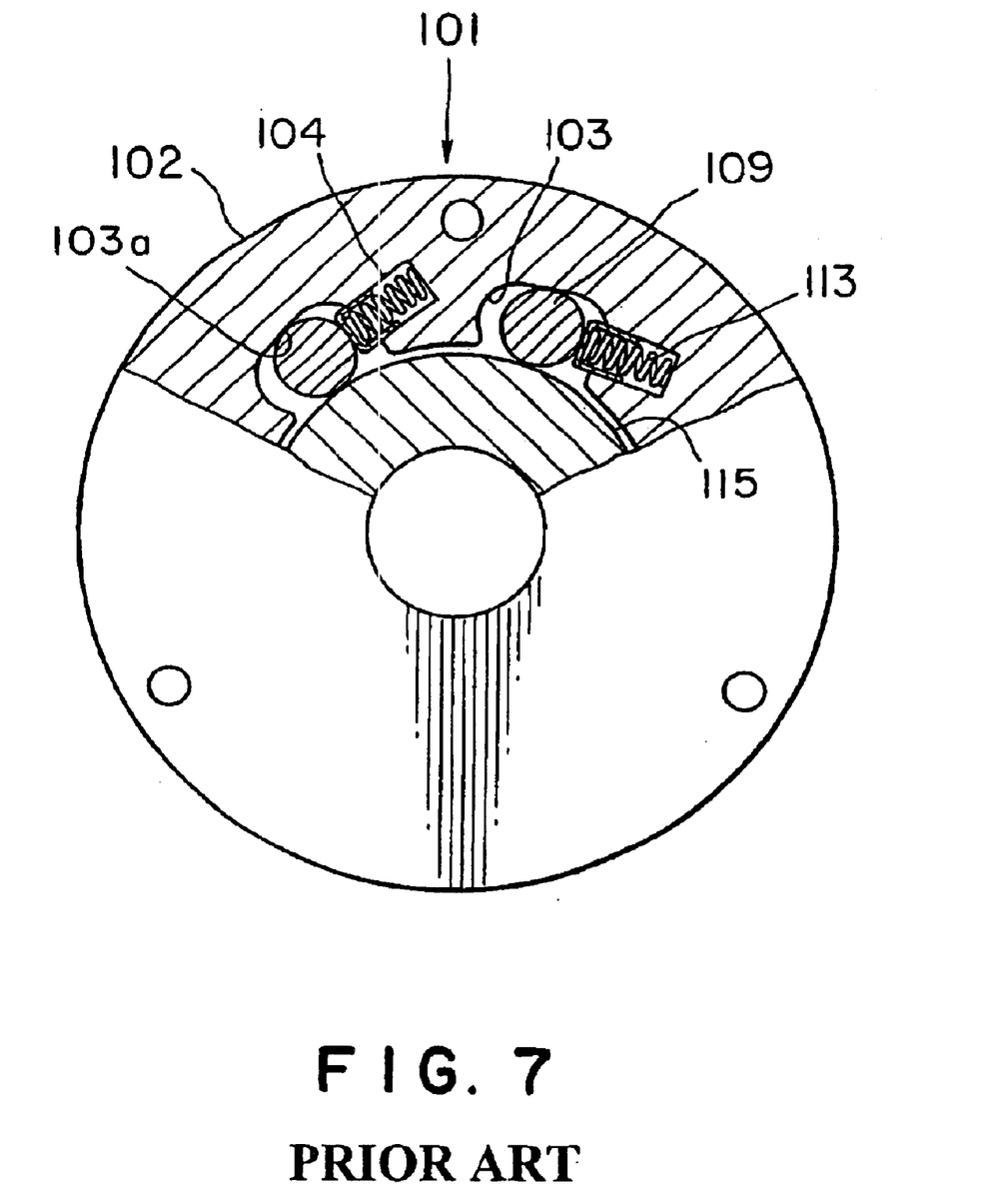
FIG. 7 is a sectional view taken by line C—C in FIG. 6.

As shown in FIG. 7, the rollers 109 are placed in wedge-shaped first pockets 103 formed in the inner circumferential side of the outer race 102. A second pocket 104 is formed so as to be connected to the deeper end of the first pocket 103. A spring 113 is placed in the second pocket 104 to push the roller 109 toward the shallower end of the first pocket 103. The inner race 115 and the outer race 102 rotate together when the one-way clutch 101 is locked by the frictional engagement of the bottom (outer) surfaces 103a of the first pockets 103 and the outer circumferential surface of the inner race 115.

As shown in FIG. 6, a driven gear 121 is fixedly attached to the inner race 115 of the conventional one-way clutch 101. A boss member 111 and a rotor 124 fastened together with rivets 140 are fastened to a side surface of the outer race 102 by means of bolts 117.

The boss member 111 has an outer flange 110 extending annularly and perpendicularly to its axis, and a boss portion 106 axially extending from the inner circumferential edge of the outer flange 110. The boss portion 106 is fixedly mounted on the crankshaft 131.

The rotor 124 has an inner flange 127 extending annularly and perpendicularly to its axis, and a cylindrical wheel 125 axially extending from the outer circumferential edge of the inner flange 127. Magnets 130 are attached to the inner circumferential surface of the cylindrical wheel 125, to form a part of a generator.

The conventional one-way clutch 101 transmits the driving force of the starting motor (not shown) to the crankshaft 131 via the driven gear 121 and the boss member 111. In some cases, respective axes of the one-way clutch 101 (the outer race 102) and the boss member 111 may not be aligned, due to dimensional errors of holes for the bolts 117 or the like, because the boss member 111 is fastened to the outer race 102 of the one-way clutch 101 by means of the bolts 117. In such a case, the one-way clutch 101 and the boss member 111 cannot be closely connected to the crankshaft 131, and gaps may be formed between them. Thus, sometimes, rattling movement and/or rattling noise may be generated.

If the respective axes of the one-way clutch 101, the boss member 111 and the crankshaft 131 are not aligned, the transmission of the driving force tends to be biased (unbalanced) and thus the driving force cannot be satisfactorily transmitted. In such a case, a load acts on the crankshaft 131 in a direction perpendicular to the axis of the crankshaft 131, which may cause some troubles, such as the breakdown of the one-way clutch 101, in the engine.

In addition, the holes, into which the bolts 117 are screwed or inserted, have to be formed in the outer race 102 of the one-way clutch 101 and the boss member 111, which increases machining processes, reduces productivity and increases cost.

DISCLOSURE OF THE INVENTION

Accordingly, it is an object of the present invention to solve the foregoing problems, and to provide an inexpensive one-way clutch that does not rattle, does not generate noise, is capable of satisfactorily transmitting driving force, rarely develops trouble or breakdown, and can be efficiently produced.

This invention is a one-way clutch including: an inner race supported for rotation on a power transmission shaft; an outer race concentrically surrounding the inner race; and torque transmitting members interposed between the inner race and the outer race and capable of transmitting torque in one direction of the inner race to the outer race; wherein the outer race is integrally provided with an extending portion that extends inwardly in a radius direction thereof, and the extending portion is capable of being engaged with the power transmission shaft.

According to the feature, the respective axes of the extending portion and the inner race can be easily aligned with the axis of the power transmission shaft, such as a crankshaft. Consequently, the one-way clutch does not rattle, does not generate noise, is capable of satisfactorily transmitting driving force, rarely develops trouble or breakdown, and can be produced at a high efficiency at a low cost.

Concretely, the outer race and the extending portion are formed in a single member by, for example, forging.

Preferably, the outer race including the extending portion is subjected to a carburizing process to achieve desired high hardness. Then, the extending portion is subjected to a tempering process, to enable the extending portion to be machined so as to be fastened to the power transmission shaft. Alternatively, the outer race including the extending portion may be subjected to a carburizing process after the extending portion has been treated by an anticarburization treatment.

Alternatively, the carburized extending portion may be subjected to a carburized-part removing process after the outer race including the extending portion has been processed by a carburizing process. Alternatively, the outer race excluding the extending portion may be subjected to induction hardening after the outer race including the extending portion has been tempered.

Preferably, an axially extending cylindrical wheel (wall) is formed integrally with the outer race. In the case, the outer race, the extending portion and the cylindrical wheel may be integrally formed by, for example, forging.

DETAILED DESCRIPTION OF A BEST MODE FOR CARRYING OUT THE INVENTION

One-way clutches in preferred embodiments according to the present invention will be described with reference to accompanying drawings.

Figure 1:
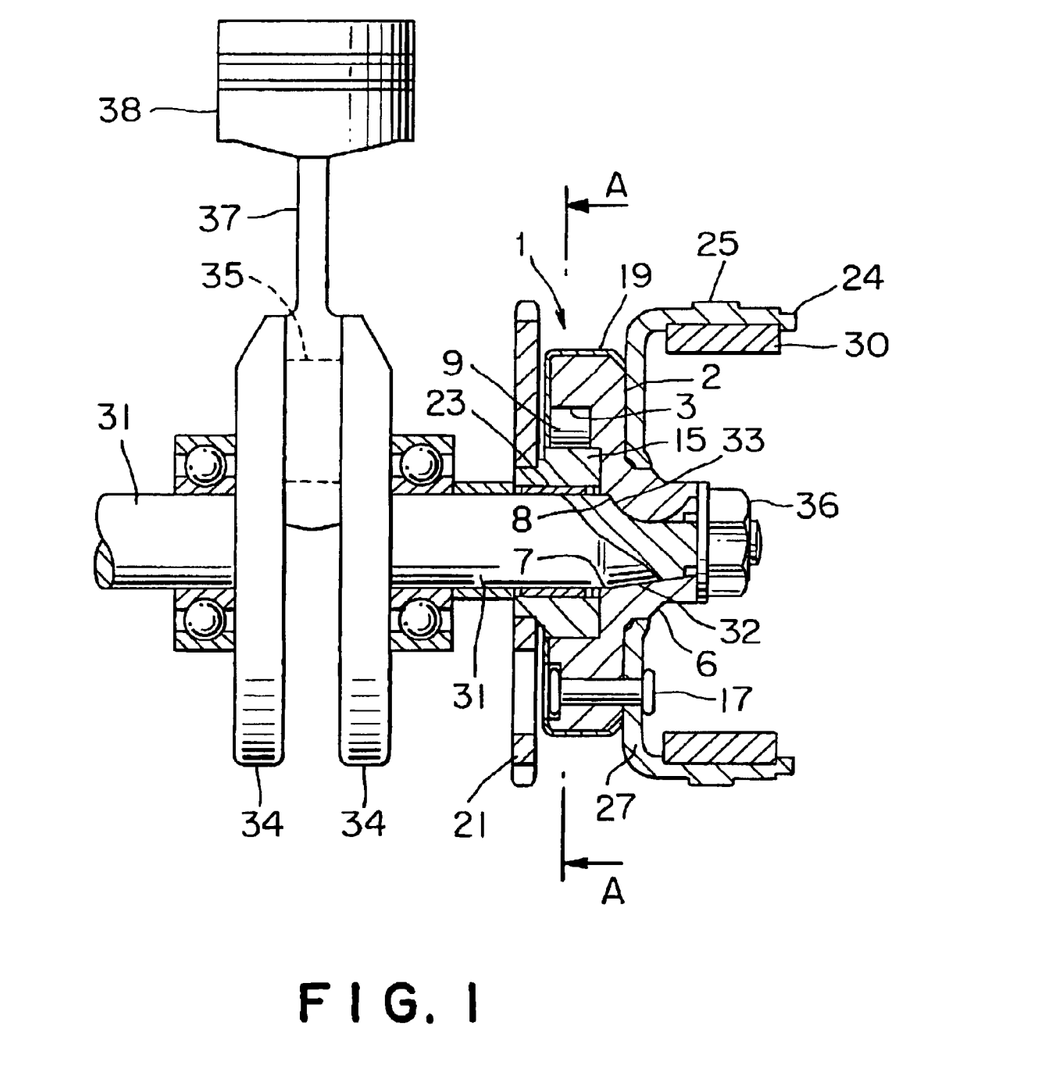
FIG. 1 is a partially sectional plan view of a one-way clutch in a first embodiment according to the present invention in a working state thereof.

Shown in FIG. 1 are a crankshaft 31, namely, the power transmission shaft of an automotive engine, and a one-way clutch 1 mounted on the crankshaft 31. The crankshaft 31 is provided with a pair of balance weights 34 that are eccentric perpendicularly to the axis thereof. A pin 35 connects the pair of balance weights 34. The pin 35 is extended through an (big) end of a connecting rod 37 on a side away from a piston 38, so as to be rotatable relative to the end. The other (small) end of the connecting rod 37 is connected to an end part of the piston 38 fitted in a cylinder (not shown) in such a manner that the connecting rod 37 is able to swing. The crankshaft 31 has a tapered end part 32 having a threaded tip part. An axial groove 33 is formed in the tapered end part 32.

A seizure-preventing member (a roller bearing in this embodiment) 23 is put on a portion of the crankshaft 31 contiguous with the tapered end part 32, and the one-way clutch 1 is mounted on the seizure-preventing member 23.

Figure 2:
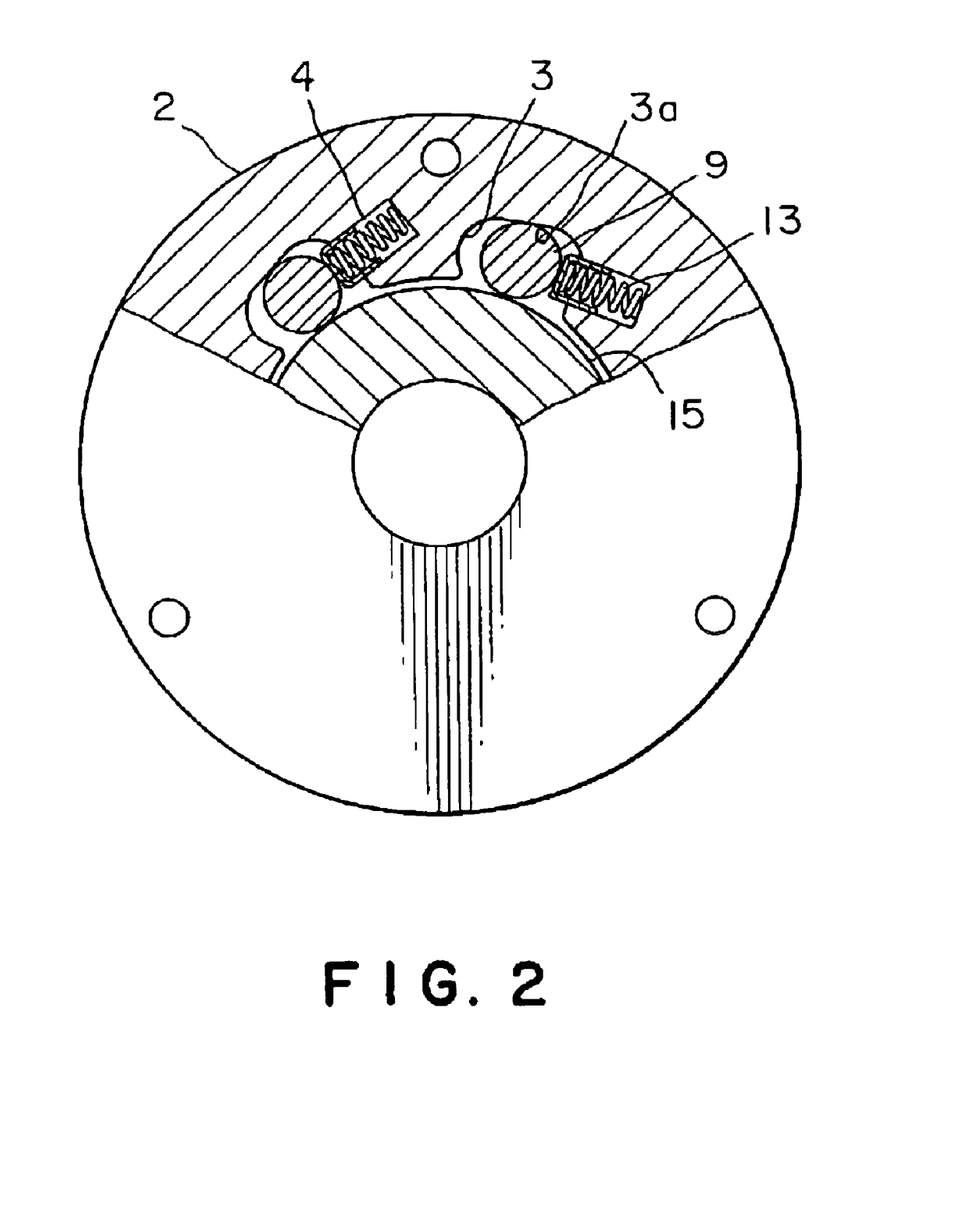
FIG. 2 is a sectional view taken by line A—A in FIG. 1.

The one-way clutch 1 has: an inner race 15 supported for rotation relative to the crankshaft 31 on the roller bearing 23; an outer race 2 concentric with and surrounding the inner race 15; and rollers 9 interposed between the inner race 15 and the outer race 2. The rollers 9 serve as torque transmitting members, As shown in FIG. 2, the rollers 9 are placed in wedge-shaped first pockets 3 formed in the inner circumferential side of the outer race 2. A second pocket 4 is formed so as to be connected to the deeper end of the first pocket 3. A spring 13 is placed in the second pocket 4 to push the roller 9 toward the shallower end of the first pocket 3.

As shown in FIG. 1, the outer race 2 is integrally provided with an extending portion 6 that extends inwardly in a radius direction thereof and then extends axially. Thus, the extending portion 6 has an L-shaped cross section having an annular part and an axial part. A tapered hole 7 is formed in the axial part of the extending portion 6. A detaining protrusion 8 projects from a side surface of the tapered hole 7. The detaining protrusion 8 engages in the groove 33 of the crankshaft 31. The tapered hole 7 of the outer race 2 fits the tapered part 32 of the crankshaft 31 closely. The outer race 2 is pressed and fixed to the tapered part 32 by screwing a nut 36 on the threaded tip part.

One end surface of each of the rollers 9 is contiguous with and regulated by the annular part of the extending portion 6 of the outer race 2. The other end surface of the same is contiguous with and regulated by a cover 19, which covers the outer race 2 and is fastened to the outer race 2 by caulking.

A driven gear 21 is fixedly combined with the inner race 15. A rotor 24 is fixed to a side surface of the extending portion 6 of the outer race 2 by means of rivets 17. The rotor 24 has an inner flat flange 27 extending annularly and perpendicularly to the axis of the rotor 24, and a cylindrical wheel 25 axially extending from the outer circumferential edge of the inner flange 27. Magnets 30 are attached to the inner circumferential surface of the cylindrical rim 25, to form a part of a generator.

An operation of the one-way clutch 1 will be described with reference to FIG. 1. When the starting motor (not shown) is actuated, the driving force of the starting motor is transmitted via the driven gear 21 to the inner race 15 of the one-way clutch 1. Since the springs 13 push the rollers 9 toward the shallower ends of the first pockets 3 as shown in FIG. 2, the rollers 9 are engaged frictionally with the bottom (outer) surfaces 3a of the first pockets 3 and the outer circumferential surface of the inner race 15, so that the outer race 2 rotates together with the inner race 15.

Consequently, the driving force drives (for rotation) the crankshaft 31 with which the extending portion 6 is engaged. Thus, the piston 38 is driven for a linear motion in the cylinder via the connecting rod 37 connected to the pin 35 eccentric with respect to the crankshaft 31. Thus, the engine is started.

After the engine has been started, the speed of the linear motion of the piston 38 increases. Thus, respective rotating speeds of the crankshaft 31 and the outer race 2 mounted on the crankshaft 31 increase accordingly. When the rotating speed of the outer race 2 shown in FIG. 2 increases beyond the rotating speed of the inner race 15 being driven for rotation by the starting motor, the rollers 9 of the one-way clutch 1 are forced to move toward the deeper ends of the first pockets 3. Consequently, the frictional engagement of the outer race 2 and the inner race 15 via the rollers 9 becomes ineffective, so that the outer race 2 rotates regardless of condition of the inner race 15. That is, the starting motor is never driven by the outer race 2 that rotates at a rotating speed higher than that of the starting motor.

The rotor 24 fastened to the outer race 2 of the one-way clutch 1 rotates together with the outer race 2. Thus, magnetic force of the magnets 30 attached to the inner circumferential surface of the cylindrical wheel 25 is used for power generation.

Since the outer race 2 of the one-way clutch 1 has the extending portion 6 formed integrally therewith and extended inwardly in a radius direction thereof, and the extending portion 6 is engaged with the power transmission shaft 31, the axis of the extending portion 6 engaged with the crankshaft 31 and the axis of the inner race 15 can be easily aligned with the axis of the crankshaft 31. Therefore, the extending portion 6 of the outer race 2 and the inner race 15 can be closely connected to the crankshaft 31 and the roller bearing 23 so that any gaps may not be formed. Since the extending portion 6 to be engaged with the crankshaft 31 is integrally formed with the outer race 2, work for assembling is easy.

The outer race 2 and the extending portion 6 integral with the outer race 2 are formed by forging. Whereas the outer race 2 must have a high hardness, the extending portion 6 must have a low hardness so as to improve closeness of the engagement of the extending portion 6 with the tapered end part 32 of the crankshaft 31. Since the conventional outer race and the conventional extending portion are separate members, the conventional outer race and the conventional extending portion are subjected separately to different heat treatment processes and/or formed of different materials, respectively, to adjust the irrespective hardnesses. However, since the outer race 2 and the extending portion 6 of this embodiment are formed of the same material in a single member, some measures must be contrived to adjust their hardnesses.

The inventors of the present invention acquired a knowledge that it is effective to subject the outer race 2 to a carburizing process to finish the outer race 2 in a high hardness, and then to subject the extending portion 6 to a tempering process to finish the extending portion 6 in a low hardness. The inventors of the present invention also acquired another knowledge that it is also effective to subject the outer race 2 including the extending portion to a carburizing process after treating the extending portion 6 by an anticarburization treatment.

In addition, the inventors of the present invention also acquired another knowledge that it is effective to process the outer race 2 by a carburizing process, and then to remove a carburized part of the extending portion 6 by a removing process (machining). Moreover, the inventors of the present invention acquired another knowledge that it is also effective to subject the outer race 2 excluding the extending portion 6 to induction hardening after tempering the outer race 2 including the extending portion 6 by a tempering process. (Hardening effect of the tempering process is not as high as that of the carburizing process.)

Figure 3:
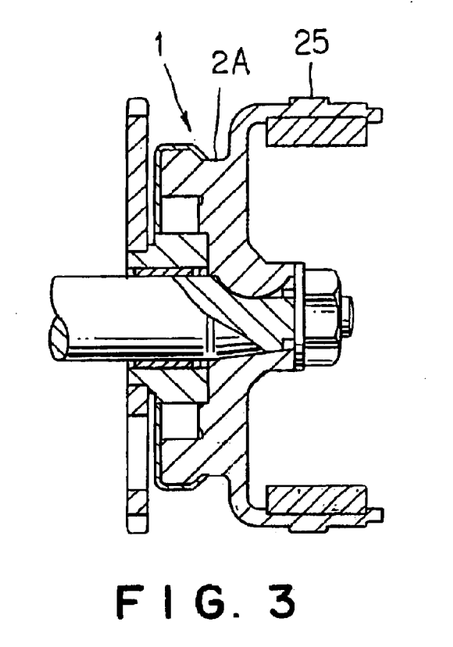
FIG. 3 is a partially sectional plan view of a one-way clutch in a second embodiment according to the present invention in a working state thereof.

In the one-way clutch 1 of the above embodiment, the rotor 24 is fastened to the extending portion 6 of the outer race 2 with the rivets 17. However, as shown in FIG. 3, the cylindrical wheel 25 may be formed integrally with the outer race 2A so as to extend axially from the outer periphery of the outer race 2A. If the cylindrical wheel 25 is formed integrally with the outer race 2A, the axis of the cylindrical wheel 25 can be also easily aligned with that of the outer race 2A.

Figure 4:
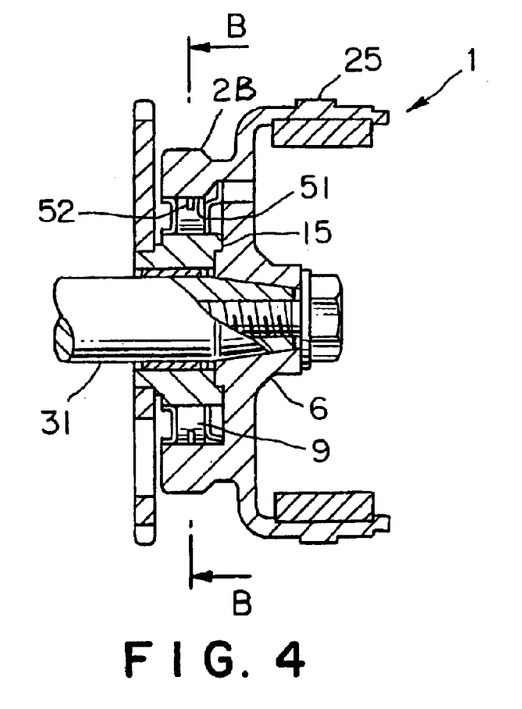
FIG. 4 is a partially sectional plan view of a one-way clutch in a third embodiment according to the present invention in a working state thereof.
Figure 5:
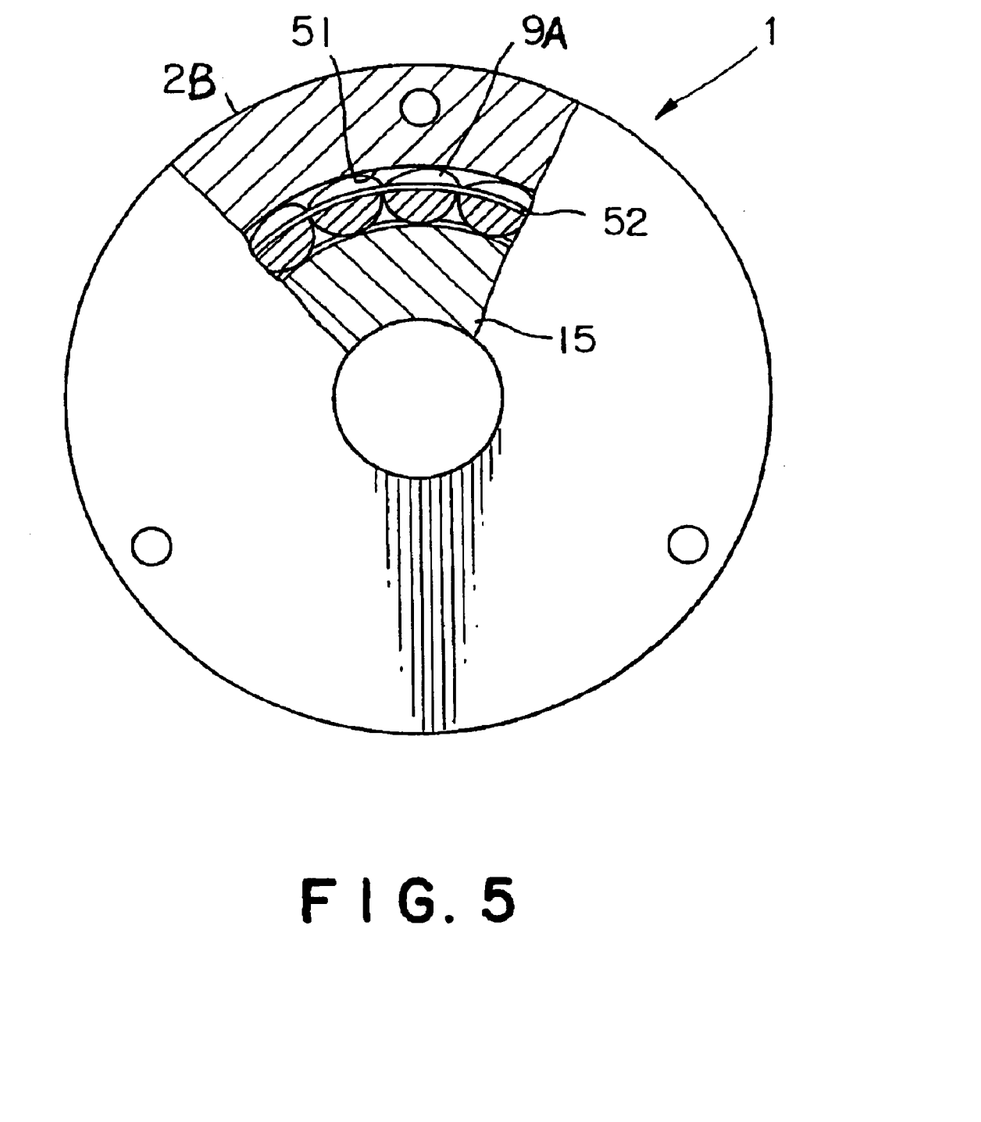
FIG. 5 is a sectional view taken by line B—B in FIG. 4.

Although the rollers 9 are used as torque transmitting members in the one-way clutch 1 of the above embodiment, the torque transmitting members are not limited to the rollers 9As. For example, cams 9 may be used as shown in FIGS. 4 and 5. In a one-way clutch 1 using the cams 9A the cams 9A are arranged successively in a space 51 formed between an outer race 2B and an inner race 15, and the cams 9A are held in place by a retaining ring 52. The cams 9A jam frictionally between the outer race 2B and the inner race 15 to engage the one-way clutch 1 when the inner race 15 rotates in one direction relative to the outer race 2B. On the other hand, the cams 9A are disengaged from the outer race 2B and the inner race 15 according to shapes of the cams 2A to disengage the one-way clutch 1 when the inner race 15 rotates in the other direction relative to the outer race 2B, so that the outer race 2B is allowed to rotate individually.

The present invention is applicable to a one-way clutch employing sprags each having a constricted middle part as torque transmitting members as well as to those employing rollers or cams as torque transmitting members.

What is claimed is:

1. A one-way clutch comprising:
    an inner race supported for rotation on a power transmission shaft;
    an outer race concentrically surrounding the inner race; and
    torque transmitting members interposed between the inner race and the outer race and capable of transmitting torque in one direction of the inner race to the outer race;
    wherein the outer race is integrally provided with an extending portion that extends inwardly in a radius direction thereof, and
    the extending portion is capable of being engaged with the power transmission shaft, the outer race and the extending portion being formed as a single member by forging, wherein
    the outer race including the extending portion is subjected to a carburizing process, and then the extending portion is treated by a tempering process.

2. A one-way clutch comprising:
    an inner race supported for rotation on a power transmission shaft;
    an outer race concentrically surrounding the inner race; and
    torque transmitting members interposed between the inner race and the outer race and capable of transmitting torque in one direction of the inner race to the outer race;
    wherein the outer race is integrally provided with an extending portion that extends inwardly in a radius direction thereof, and
    the extending portion is capable of being engaged with the power transmission shaft, the outer race and the extending portion being formed as a single member by forging, wherein
    the extending portion is treated by an anticarburization process, and then the outer race including the extending portion is subjected to a carburizing process.

3. A one-way clutch comprising:
    an inner race supported for rotation on a power transmission shaft
    an outer race concentrically surrounding the inner race; and
    torque transmitting members interposed between the inner race and the outer race and capable of transmitting torque in one direction of the inner race to the outer race;
    wherein the outer race is integrally provided with an extending portion that extends inwardly in a radius direction thereof, and
    the extending portion is capable of being engaged with the power transmission shaft, the outer race and the extending portion being formed as a single member by forging, wherein
    the outer race including the extending portion is subjected to a carburizing process, and then the extending portion is subjected to a process of removing a carburized part thereof.

4. A one-way clutch comprising:
    an inner race supported for rotation on a power transmission shaft;
    an outer race concentrically surrounding the inner race; and
    torque transmitting members interposed between the inner race and the outer race and capable of transmitting torque in one direction of the inner race to the outer race;
    wherein the outer race is integrally provided with an extending portion that extends inwardly in a radius direction thereof, and
    the extending portion is capable of being engaged with the power transmission shaft, the outer race and the extending portion being formed as a single member by forging, wherein
    the outer race including the extending portion is treated by a tempering process, and then the outer race excluding the extending portion is subjected to induction hardening.

5. A one-way clutch comprising:
    an inner race supported for rotation on a power transmission shaft;

an outer race concentrically surrounding the inner race; and torque transmitting members interposed between the inner race and the outer race and capable of transmitting torque in one direction of the inner race to the outer race;

wherein the outer race is integrally provided with an extending portion that extends inwardly in a radius direction thereof, and the extending portion is capable of being engaged with the power transmission shaft, the outer race and the extending portion being formed as a single member by forging, wherein an axially extending cylindrical wheel is formed integrally with the outer race.

6. A one-way clutch according to claim 5, wherein the outer race, the extending portion and the cylindrical wheel are integrally formed by forging.

7. A power transmission system comprising:

a power transmission shaft, and a one-way clutch including: an inner race supported for rotation on the power transmission shaft; an outer race concentrically surrounding the inner race; and torque transmitting members interposed between the inner race and the outer race and capable of transmitting torque in one direction of the inner race to the outer race;

wherein the outer race is integrally provided with an extending portion that extends inwardly in a radius direction thereof, the extending portion being capable of being engaged with the power transmission shaft, the outer race and the extending portion being formed as a single member by forging, and the outer race, including the extending portion, being subjected to a carburizing process, and then the extending portion is treated by a tempering process.

8. A power transmission system comprising:

a power transmission shaft, and a one-way clutch including: an inner race supported for rotation on the power transmission shaft; an outer race concentrically surrounding the inner race; and torque transmitting members interposed between the inner race and the outer race and capable of transmitting torque in one direction of the inner race to the outer race, wherein the outer race is integrally provided with an extending portion that extends inwardly in a radius direction thereof, the extending portion being capable of being engaged with the power transmission shaft, the outer race and the extending portion being formed as a single member by forging, and the extending portion is treated by an anticarburization process, and then the outer race including the extending portion is subjected to a carburizing process.

9. A power transmission system comprising:

a power transmission shaft, and a one-way clutch including: an inner race supported for rotation on the power transmission shaft; an outer race concentrically surrounding the inner race; and torque transmitting members interposed between the inner race and the outer race and capable of transmitting torque in one direction of the inner race to the outer race, wherein the outer race is integrally provided with an extending portion that extends inwardly in a radius direction thereof, the extending portion being capable of being engaged with the power transmission shaft, the outer race and the extending portion being formed as a single member by forging, and the outer race, including the extending portion, being subjected to a carburizing process, and then the extending portion is subjected to a process of removing a carburized part thereof.

10. A power transmission system comprising:

a power transmission shaft, and a one-way clutch including: an inner race supported for rotation on the power transmission shaft; an outer race concentrically surrounding the inner race; and torque transmitting members interposed between the inner race and the outer race and capable of transmitting torque in one direction of the inner race to the outer race, wherein the outer race is integrally provided with an extending portion that extends inwardly in a radius direction thereof, the extending portion being capable of being engaged with the power transmission shaft, the outer race and the extending portion being formed as a single member by forging, and the outer race, including the extending portion, being treated by a tempering process, and then the outer race excluding the extending portion is subjected to induction hardening.

11. A power transmission system comprising:

a power transmission shaft, and a one-way clutch including: an inner race supported for rotation on the power transmission shaft; an outer race concentrically surrounding the inner race; and torque transmitting members interposed between the inner race and the outer race and capable of transmitting torque in one direction of the inner race to the outer race, wherein the outer race is integrally provided with an extending portion that extends inwardly in a radius direction thereof, the extending portion being capable of being engaged with the power transmission shaft, and an axially extending cylindrical wheel formed integrally with the outer race.

12. A power transmission system according to claim 11, wherein the outer race, the extending portion and the cylindrical wheel are integrally formed by forging.

* * * * *